(12) United States Patent
Hamon

(10) Patent No.: US 12,096,841 B2
(45) Date of Patent: Sep. 24, 2024

(54) TANK CARRIER WITH BACKPACK STRAPS AND DOLLY

(71) Applicant: MulePro Industries LLC, Benbrook, TX (US)

(72) Inventor: Richard A. Hamon, Benbrook, TX (US)

(*) Notice: Subject to any disclaimer, the term of this patent is extended or adjusted under 35 U.S.C. 154(b) by 0 days.

(21) Appl. No.: 17/869,651

(22) Filed: Jul. 20, 2022

(65) Prior Publication Data

US 2023/0148735 A1 May 18, 2023

Related U.S. Application Data

(60) Provisional application No. 63/286,040, filed on Dec. 5, 2021, provisional application No. 63/279,061, filed on Nov. 12, 2021, provisional application No. 63/279,058, filed on Nov. 12, 2021.

(51) Int. Cl.
| | |
|---|---|
| *A45F 3/10* | (2006.01) |
| *B62B 5/00* | (2006.01) |
| *B62B 5/06* | (2006.01) |
| *A45F 3/00* | (2006.01) |

(52) U.S. Cl.
CPC .............. *A45F 3/10* (2013.01); *B62B 5/0023* (2013.01); *B62B 5/067* (2013.01); *A45F 2003/003* (2013.01); *B62B 2203/44* (2013.01)

(58) Field of Classification Search
CPC ...... A45F 3/10; A45F 3/00; A45F 3/04; A45F 2003/003; B62B 5/0023; B62B 5/067; B62B 5/06; B62B 2203/44; B62B 1/14; B62B 1/264; B62B 1/00; B62B 1/16; B62B 1/26
See application file for complete search history.

(56) References Cited

U.S. PATENT DOCUMENTS

| | | | | |
|---|---|---|---|---|
| 4,253,716 A | * | 3/1981 | Turner, Jr. ............ | F17C 13/085 312/249.8 |
| 4,438,764 A | * | 3/1984 | Eppolito .................. | A62B 9/04 224/259 |
| 4,614,331 A | | 9/1986 | Simon | |
| 5,396,885 A | * | 3/1995 | Nelson ................... | A62B 25/00 128/205.24 |
| 5,419,569 A | * | 5/1995 | Walla ..................... | A62B 25/00 280/47.27 |
| 5,447,216 A | * | 9/1995 | Freyvogel .............. | A45C 5/146 383/117 |
| 5,769,431 A | * | 6/1998 | Cordova ................ | B62D 51/04 280/47.131 |

(Continued)

OTHER PUBLICATIONS

Internet Advertisement from unknown date, located on Google Shopping.

(Continued)

*Primary Examiner* — James M Dolak
(74) *Attorney, Agent, or Firm* — James E. Walton

(57) ABSTRACT

A tank carrier contains a retractable dolly and a pair of straps to allow a user to carry it on their back. The tank carrier also contains ladder hooks to allow an individual to rest the carrier on a ladder at any point. The side surfaces of the tank carrier also contains compartments to store rods or sticks. The access door to reach the tanks are also alterable to better secure the tanks in position while also providing another storage compartment.

18 Claims, 20 Drawing Sheets

(56) References Cited

U.S. PATENT DOCUMENTS

| | | | | |
|---|---|---|---|---|
| 5,829,585 A * | 11/1998 | Kao | ............... | A63B 55/60 |
| | | | | 280/DIG. 6 |
| 5,947,351 A * | 9/1999 | Garofalo | ............... | A45F 3/04 |
| | | | | 294/169 |
| 6,945,438 B1 * | 9/2005 | Shih | ............... | A01M 7/0035 |
| | | | | 239/722 |
| 7,438,084 B2 * | 10/2008 | Trettin | ............... | B65H 75/42 |
| | | | | 137/355.16 |
| 7,942,429 B2 * | 5/2011 | Hill | ............... | B62B 1/20 |
| | | | | 280/79.5 |
| 8,035,525 B2 * | 10/2011 | Noonchester | ............... | B62B 3/10 |
| | | | | 340/673 |
| 8,262,108 B2 * | 9/2012 | Al-Hasan | ............... | B62B 3/04 |
| | | | | 280/47.371 |
| 8,641,056 B1 * | 2/2014 | Carter | ............... | B62B 1/26 |
| | | | | 280/30 |
| 10,683,199 B2 * | 6/2020 | Stumpf | ............... | B67D 7/845 |
| 10,738,533 B2 * | 8/2020 | Weyrauch | ............... | E06C 7/50 |
| 11,317,700 B2 * | 5/2022 | Boyd | ............... | A45F 3/10 |
| 11,882,922 B2 * | 1/2024 | Joko | ............... | G02B 6/25 |
| 11,897,533 B2 * | 2/2024 | Bradley | ............... | B62B 5/068 |
| 12,012,140 B2 * | 6/2024 | Marchal | ............... | B62B 3/104 |
| 2006/0261567 A1 * | 11/2006 | Knox | ............... | B62B 1/264 |
| | | | | 280/47.131 |
| 2009/0229914 A1 | 9/2009 | Liles | | |
| 2011/0264014 A1 | 10/2011 | Angold | | |
| 2013/0213920 A1 | 8/2013 | Oliver et al. | | |

OTHER PUBLICATIONS

International Search Report dated Apr. 18, 2023 from International Appl. No. PCT/US2022/049659.

International Preliminary Report on Patentability dated Jun. 20, 2024 from International Appl. No. PCT/US2022/049659.

\* cited by examiner

TANK CARRIER WITH BACKPACK STRAPS AND DOLLY

This application claims the benefit of U.S. Provisional Application No. 63/286,040 filed on 5 Dec. 2021, titled "Safe Military-MulePro;" claims the benefit of U.S. Provisional Application No. 63/279,061 filed on 12 Nov. 2021, titled "Safe Military-MulePro;" and claims the benefit of U.S. Provisional Application No. 63/279,058 filed on 12 Nov. 2021, titled "Safe Military-MulePro;" all of which are incorporated herein in their entirety for all purposes.

BACKGROUND

1. Field of the Invention

The present application relates to tank carriers. In particular, the present application relates to tank carriers that can be carried by the user which contain more storage compartments on the carrier.

2. Description of Related Art

It is common that buildings contain air conditioning, heating, and refrigeration equipment outside on top of the roof of the buildings themselves. Also, not every building has an easy access to get up onto the roof. Some have stairs, externally located building side ladders, internal building ladders that lead up through roof hatches, and some have no roof access stairs or ladders at all. This creates the present problem when the equipment on the roof needs maintenance or repair and the tools and equipment needed to repair them have to be physically transported up onto the roof and to the equipment. The overall safety and physical strain put on the user when getting the tools and equipment up onto and off of the top of the roof and to the equipment is the main concern here. At the moment with the prior art, a user can only get the equipment up onto and off of the roof of a building by either dangerously single handedly carrying the equipment up and down the ladders and stairs of a building, or by dangerously tying a rope to the equipment with no known or secure place to connect the rope to.

At times an individual user will have to take multiple trips up and down ladders or stairs given the large number of tools and other equipment needed in order to repair this type of equipment on roofs. This creates an even more significant amount of danger and physical stress to the user as the individual has to climb and descend the ladder or stairs multiple times while carrying the heavy equipment. The strain comes from the individual user climbing the ladder with heavy equipment and with bringing the heavy equipment to the location itself. Individual users will typically use one hand to carry their tools or bags from their vehicle all the way up the ladder which leaves an uneven strain on the individual. This puts more strain on one side of the body over the other and the individual will deal with pain over time because of this. Also, if the individual gets exhausted or experiences spasms or complications while climbing the ladder, there is nothing to help prevent their equipment from dragging them off the ladder at that point or making the situation even worse.

The safety and physical stress of the individuals while working on these projects should be preserved but the current method of carrying up the equipment as the person single handedly goes up a ladder or stairs, or roping up the equipment with no known secure place to connect a rope or rope clip to, and then when on the roof having to hand carry all the equipment and tools to the unit does not preserve this. There have been some improvements to this by having general bags or boxes that individuals can attach to ladders, or hold in a safer manner, which decrease the safety risk. However, there are still numerous concerns on the safety and physical strain that is put on the individuals in this work.

Although there are some methods of carrying equipment to job sites that require the use of ladders and multiple dollies, many shortcomings still remain.

BRIEF DESCRIPTION OF THE DRAWINGS

The novel features believed characteristic of the present application are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Figure 1:
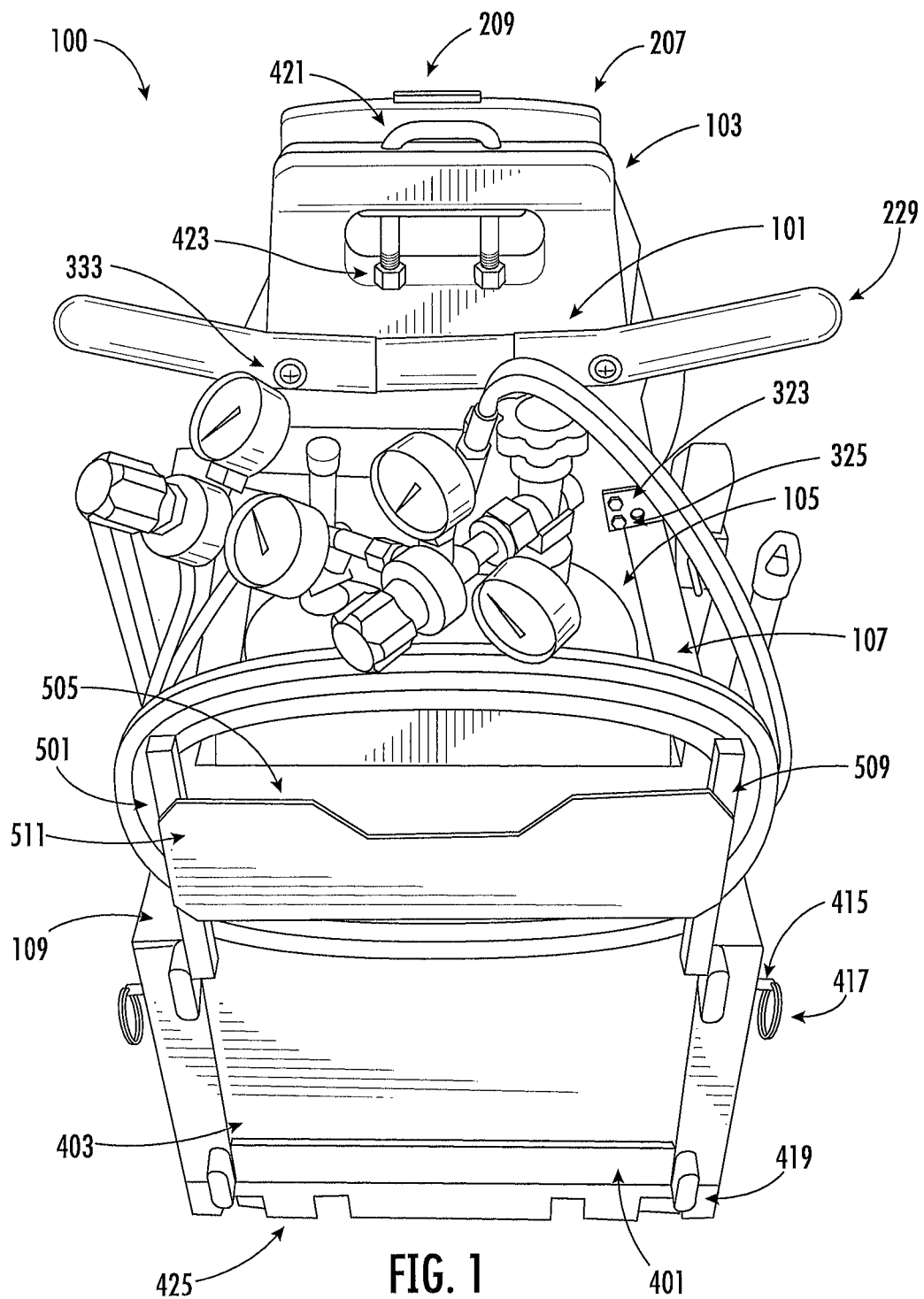
FIG. 1 is a perspective front view of the tank carrier, according to the present application.

Referring to FIG. 1 in the drawings, the tank carrier with backpack straps and dolly 100 is illustrated. The structure of tank carrier 100 is a hollow arched base 101 which is comprised of a top handle portion 103, a tank carrier compartment 105, slanted end walls 107, straight end walls 109, and notched base 111. FIG. 1 also shows that tank carrier 100 comprises tow handle 207, tow handle release 209, two handed cross bar double handles 229, attachment base 323, attachment base fasteners 325, cross bar fasteners 333, retractable tow cradle 401, base 403, fastener pin 415, loop handle 417, support legs 419, retractable hoist ring 421, and retractable hoist ring stoppers 423, retractable cradle hinge 425, bottle access door 501, back plate 505, T-shaped supports 509, and front plate 511. Tank carrier 100 may be used to carry, but is not limited to carry, oxygen and acetylene bottles.

Although the present application has been described with respect to hand tools, power tools, and equipment used by workers, such as heating and air conditioning workers, it will be appreciated that tool carrier 100 may easily be adapted and used by other types of workers, such as health care workers, military personnel, and other types of first responders. For example, emergency medical workers could use tool carrier 100 as a medical rescue pack to store, transport, and use items such as automated external defibrillators, oxygen tanks, medicine, bandages, IV bags, and other such emergency medical equipment.

Base 101 is hollow in order to ensure that tank carrier 100 will stay light weight enough for a user to carry it without issue. Tank carrier 100 may be made out of plastic, metal, wood, or any other lightweight material. Top handle portion 103 forms the top of tank carrier 100 and is square in shape and solid besides the handle portion at the very top and extends down to form the back wall of carrier 100. The bottom sides of handle portion 103 connect to slanted end walls 107 which in turn connects to straight end walls 109. It is appreciated that the dimensions and shapes of the end walls may change to accommodate whatever tank the manufacture designs it to carry. These three walls form tank carrier compartment 105 where the tanks are securely stored in order to keep them safe and secure during movement.

Figure 2:
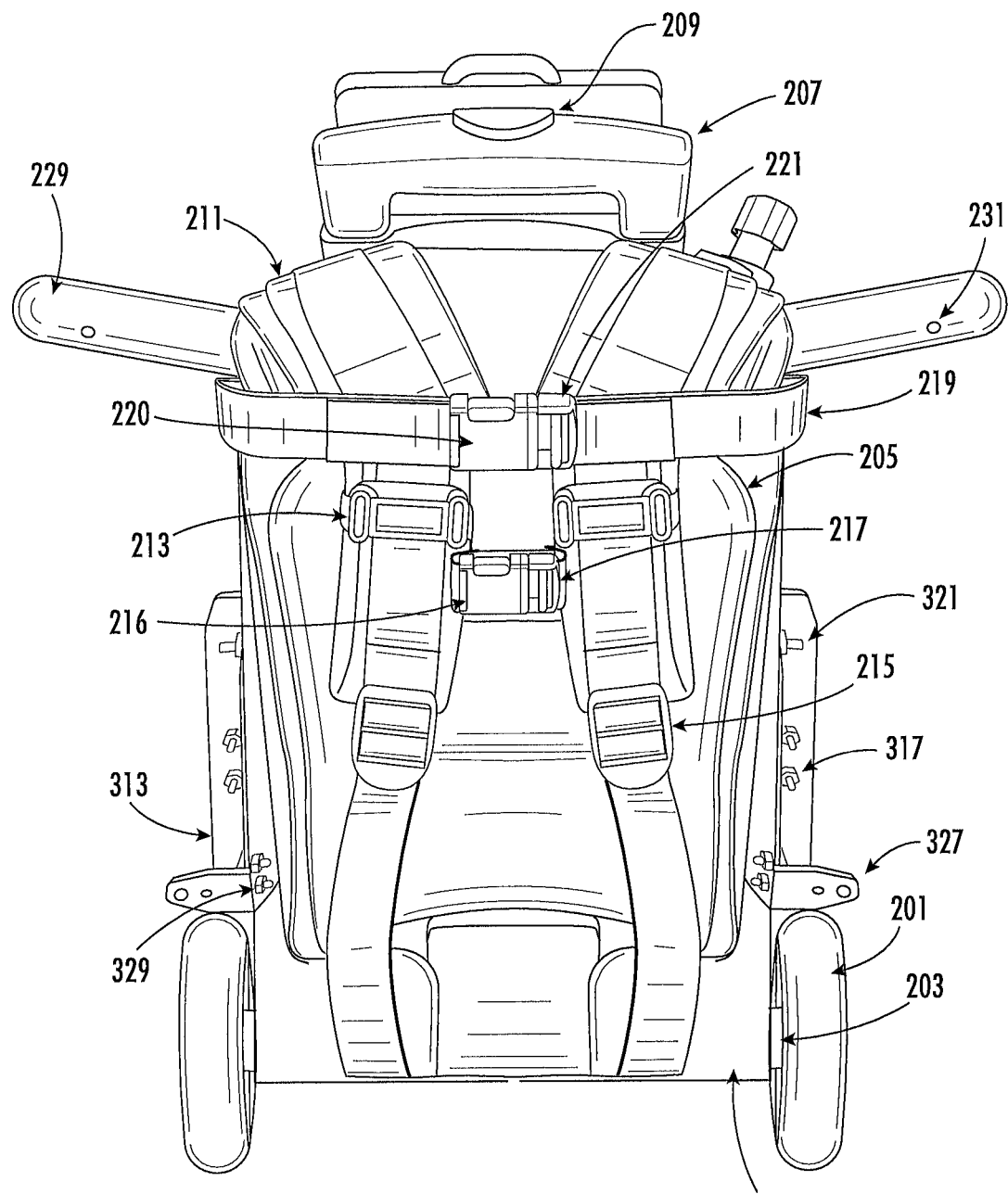
FIG. 2 is a back view of the tank carrier, according to the present application.

Referring now to FIG. 2 in the drawings, the back of the tank carrier 100 is depicted. In this figure, the wheels 201 of the tank carrier are clearly seen as being connected by axel 203 which goes through the bottom of the hollow arched body 101 of the tank carrier. Further, FIG. 2 also shows that the back of the carrier comprises back cushion 205, tow handle 207, tow handle release 209, padded replaceable straps 211, upper tightening grip 213, lower tightening grip 215, strap buckle housing 216, strap buckle insert 217, security strap 219, security strap buckle housing 220, security strap buckle insert 221, two handed crossbar double handles 229, and upper ladder hook fastener holes 231.

Back cushion 205 is attached directly to the back of hollowed arched body 101. Back cushion 205 supports the user while they are wearing the carrier and makes it easier for them to carry it around for longer periods of time. Back cushion 205 is secured to the back of hollow arched body 101 by back cushion fasteners 233 which can be seen in FIG. 12. Connected to the top of back cushion 205 are two padded replaceable straps 211 which are attached to the upper left and right side of cushion 205. Padded straps 211 allow the user to carry tank carrier 100 on their shoulders which will let users carry it for longer periods and experience less fatigue. Also, straps 211 being replaceable will allow the user to change them out if they become worn down or if the user desires straps that have more cushion. Padded replaceable straps 211 can also be tightened to fit the body of the user by using upper tightening grip 213 or lower tightening grip 215 to achieve this. These tightening grips will use the extra lengths of the straps to either make it tighter or looser on the user which will allow the user to set it to where it fits best on them so it's secured and comfortable.

Strap buckle housing 216 is found on the left padded strap 211 when looking at the back of tank carrier 100 and strap buckle insert 217 is on the right padded strap 211. Buckle insert 217 will be inserted into buckle housing 216 to secure the two padded straps 211 together. When secured in this fashion, the straps will not be able to slide off the user during movement. Security strap 219 provides a strap which holds the wide padded backpack straps up in place and keeps them high and tight and out of the way so they don't drag the ground or get damaged when not in use, storing, or towing tank carrier 100. Security strap 219 is attached to the sides of tank carrier 100 and strap 219 buckles over padded straps 211 when securing the straps to the carrier. Security strap 219 is attached to hollow arched body 101 by security strap fastener 235 which can be seen in FIG. 12.

At the top of the hollow arched body 101 is tow handle 207. At the top of tow handle 207 is tow handle release 209 which, when pressed down, releases tow handle 207 to be pulled away from arched body 101. Tow handle 207, in combination with the wheels at the bottom of arched body 101, allow the user to pull tank carrier 100 behind them if they do not wish to carry it. Also at the top of hollow arched body 101 are two handed crossbar double handles 229 which protrude out from hollow arched body 101 on either side. Double handles 229 also have upper ladder hook fastener holes 231 going through them which allow ladder hooks 309 to be fastened in place there. These double handles will provide the user with a secure way to lift tank carrier 100 up. Since tank carrier 100 is heavier than most, double handles 229 gives the user a safer and more secure way to use both hands to lift tank carrier 100 so that the user is not injured from the strain of lifting the carrier. Double handles 229 are secured to tank carrier 100 by cross bar fasteners 333 which can be seen in FIG. 1.

Figure 3:
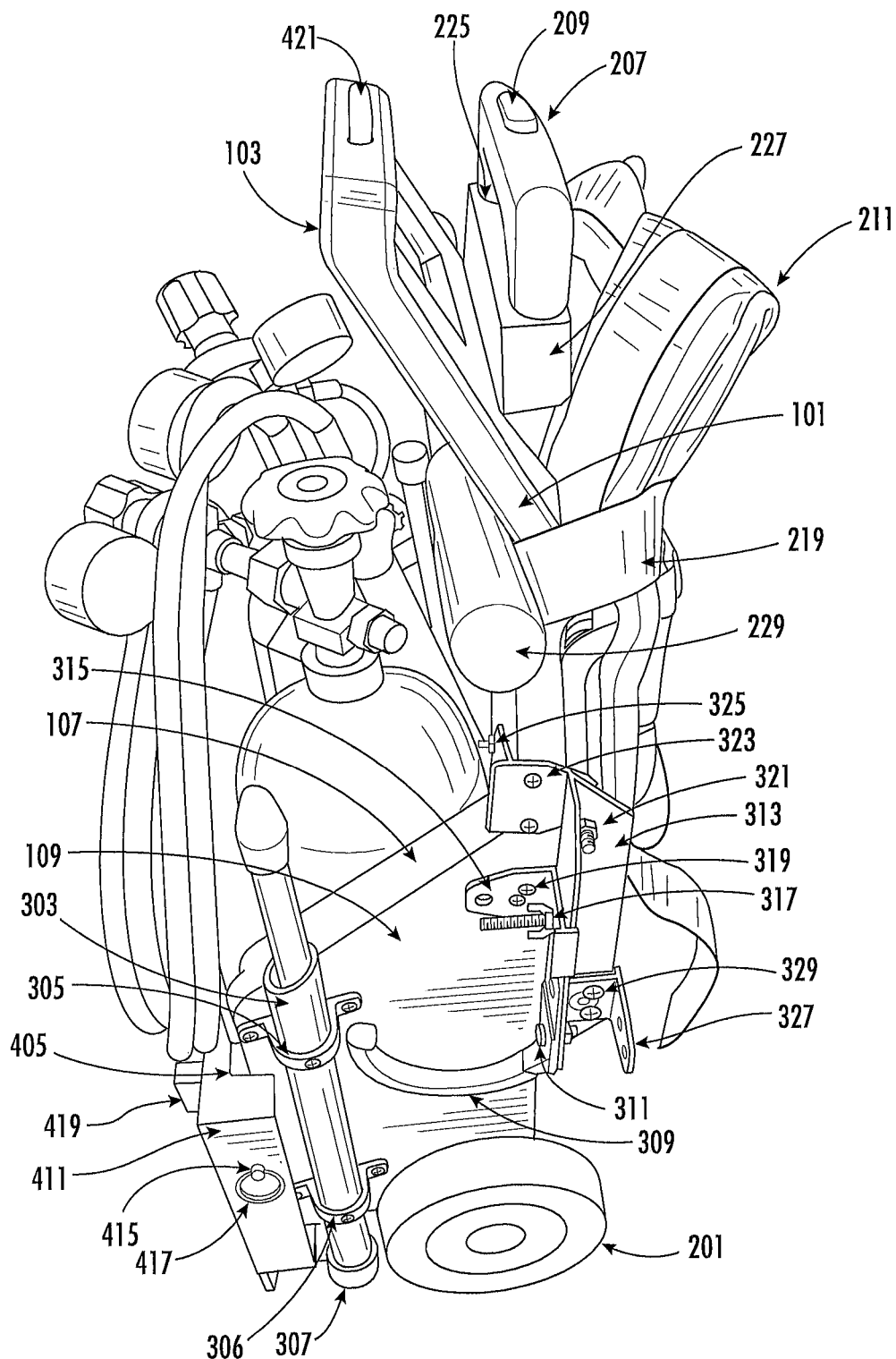
FIG. 3 is a perspective right side view of the tank carrier, according to the present application.
Figure 4:
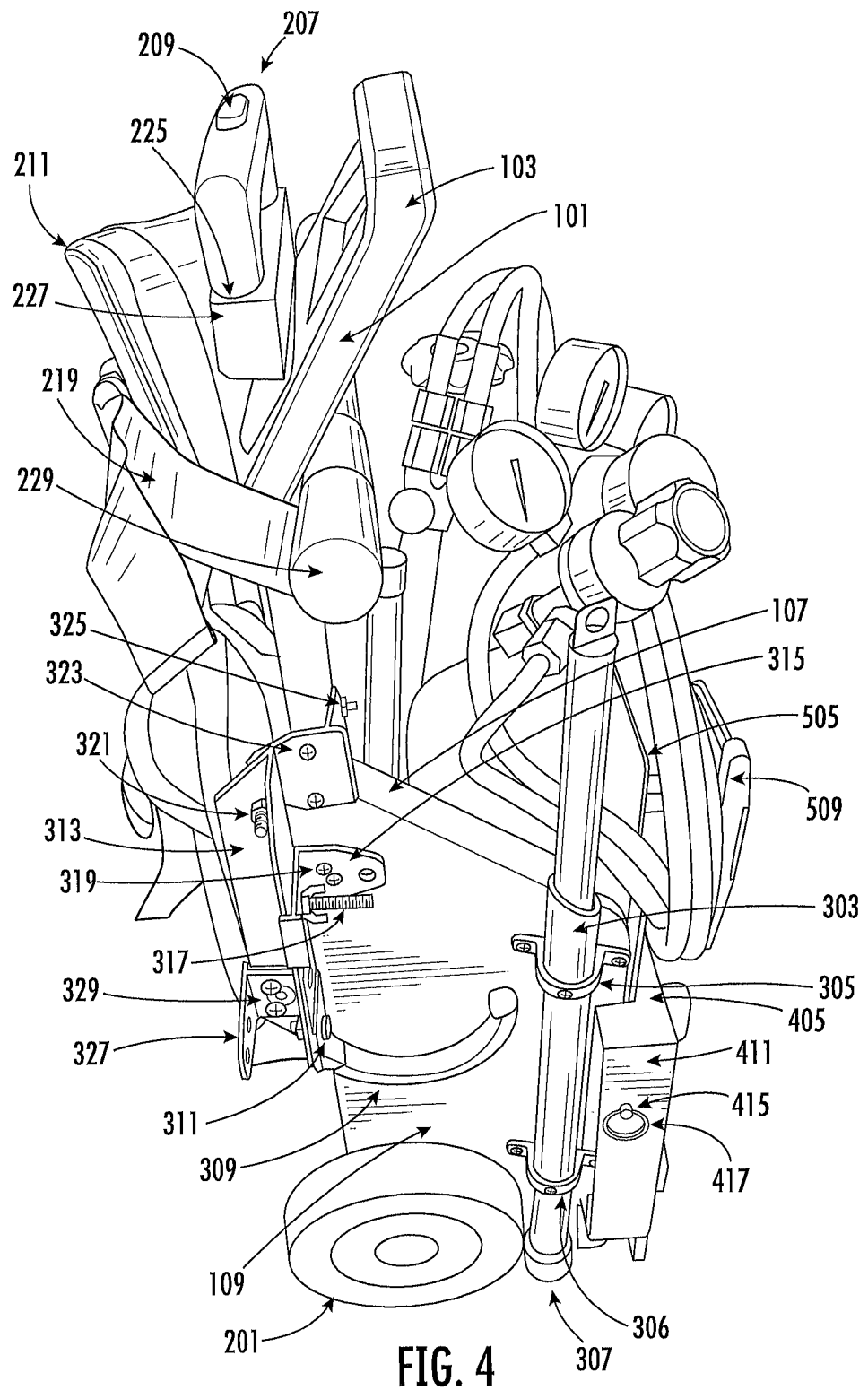
FIG. 4 is a perspective left side view of the tank carrier, according to the present application.
Figure 6:
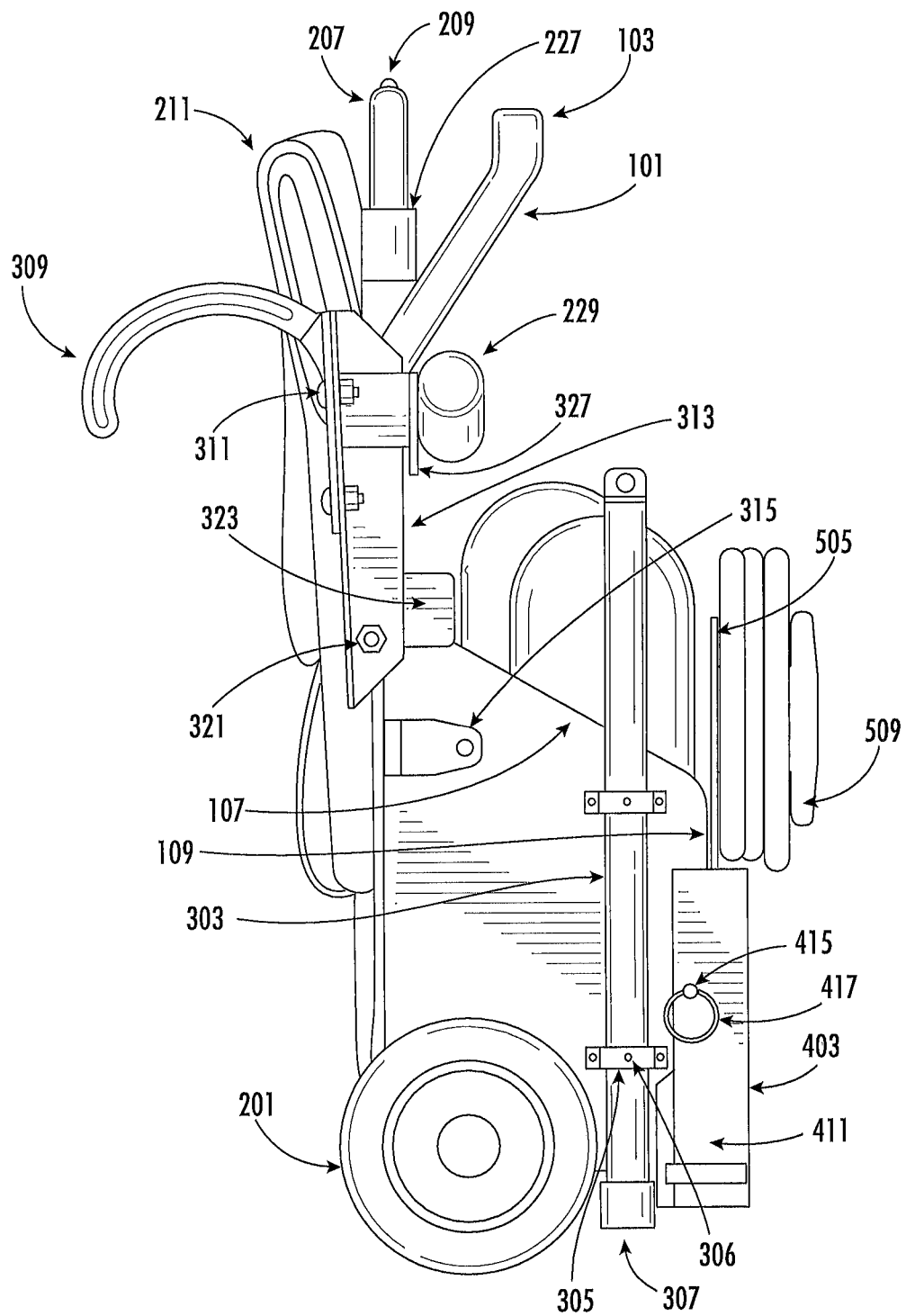
FIG. 6 is a left side view of the tank carrier, according to the present application.

Referring now to FIGS. 3, 4, and 6 in the drawings, side views of tank carrier 100 are depicted. FIGS. 3, 4, and 6 show that the sides of tank carrier 100 comprises rod compartments 303, C-shaped fasteners 305, screws 306, balancing feet 307, retractable ladder hooks 309, hook fastener 311, rotatable hook base 313, lower hook base 315, lower hook base fastener 317, lower hook base screws 319, hook base rotatable fastener 321, attachment base 323, attachment base fasteners 325, upper hook base 327, and upper hook base fasteners 329.

Rod compartments 303 are found on the left and right sides of tank carrier 100 and can be used to store rod shaped equipment. This provides another way for the user to store all their equipment onto one object when they are climbing a ladder or carting the carrier wherever they need to go which frees the hands of the user thus making it safer. Rod compartments 303 are secured to straight end walls 109 by two C-shaped fasteners 305 which attach to the upper and lower ends of rod compartment 303. C-shaped fasteners 305 are secured to rod compartment 303 and arched body 101 by screws 306 inserted on each side of rod compartment 303 and into rod compartment 303 itself. Rod compartment 303 also has balancing feet 307 at the bottom of them which are used to secure tank carrier 100 in place when it is not moving.

Figure 9:
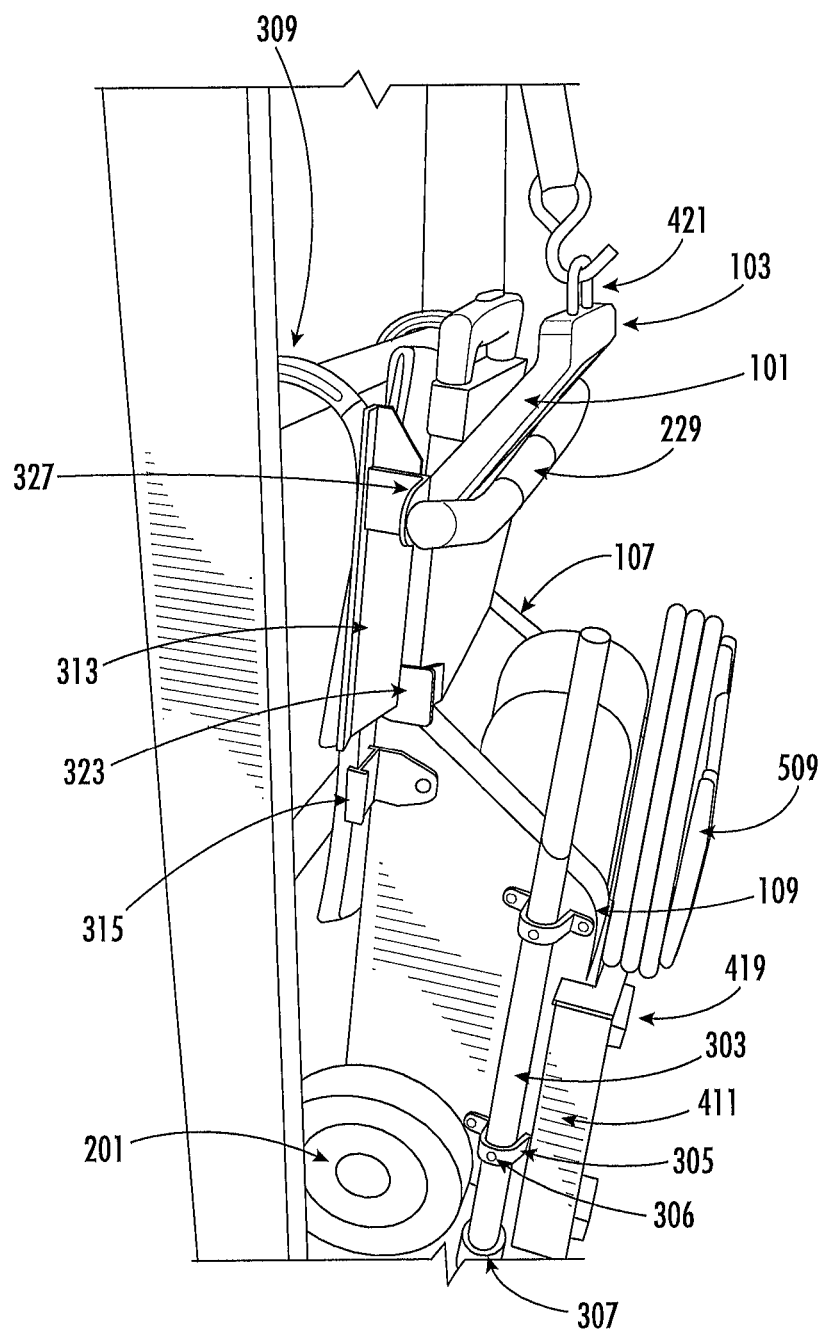
FIG. 9 is a perspective left side view of the tank carrier, according to the present application.

Ladder hook 309 is also found on both sides of tank carrier 100 and are used to attach tank carrier 100 to a ladder. Ladder hooks 309 are arched shaped and as shown in FIG. 9 in the drawings, extend out towards the back of tank carrier 100. Ladder hooks 309 are designed so if the person carrying tank carrier 100 up a ladder, or using a rope to lift it up, were to get tired in the process or if they had a muscle spasm and would need to set tank carrier 100 down, they could do so by using hooks 309 to rest tank carrier 100 on the ladder. Ladder hooks 309 will be most likely used when an individual is carrying up tank carrier 100 up a ladder themselves as opposed to when they are hoisting it because of the structure of the hooks getting in the way of hoisting, but these hooks may be used in any situation where tank carrier 100 is being taken up a ladder. Retractable ladder hooks 309 provide this service by being able to be flipped up and attach to the rungs of the ladder when this occurs. They provide hooks which allow the user to rest the tank carrier 100 on the ladder itself while the user recovers and once the user recovers, ladder hook 309 can be disengaged just by lifting up tank carrier 100 as gravity is what secures tank carrier 100 to the ladder using hooks 309.

The entire ladder hook system is attached to both sides of arched body 101 by rotatable hook base 313 and retractable ladder hooks 309 are connected to hook base 313 by hook fasteners 311. When rotatable hook base 313 is in the down position it is fastened to lower hook base 315 by lower hook base fastener 317. Lower hook base 315 is L-shaped and one side of it is attached to arched body 101 by lower hook base screws 319. The side of lower hook base 315 that is not attached to arched body 101 is just as long as rotatable hook base 313 and ends in a T shape. Being this length leads to the rotatable hook base 313 being snuggly secured when it is in the down position and fastened to lower hook base 315 which will prevent it from moving while the user is wearing or towing tank carrier 100.

Rotatable hook base 313 may also be rotated into the up position when the user wishes to use ladder hooks 309 by rotating the base around rotatable hook base fastener 321. Fastener 321 will be loosened which will allow the user to rotate base 313 to another position before tightening fastener 321 back and securing the base in the new position. Fastener 321 is also attached to attachment base 323 which is L-shaped and connects to arched body 101 by attachment base fasteners 325. The attachment base 323 is attached to the side and front of arched body 101 which provides more stability in the system. Once rotatable base 313 has been rotated into the up position, upper hook base 327 will be used to secure it. Upper hook base 327 is secured to rotatable base 313, which can be seen in FIG. 5, by upper hook base fasteners 329 and upper hook base 327 will attach to upper ladder hook fastener holes 231 on the double handles 229. A handle fastener 331 will go through the double handles 229 to secure upper hook base 327 into position.

Figure 5:
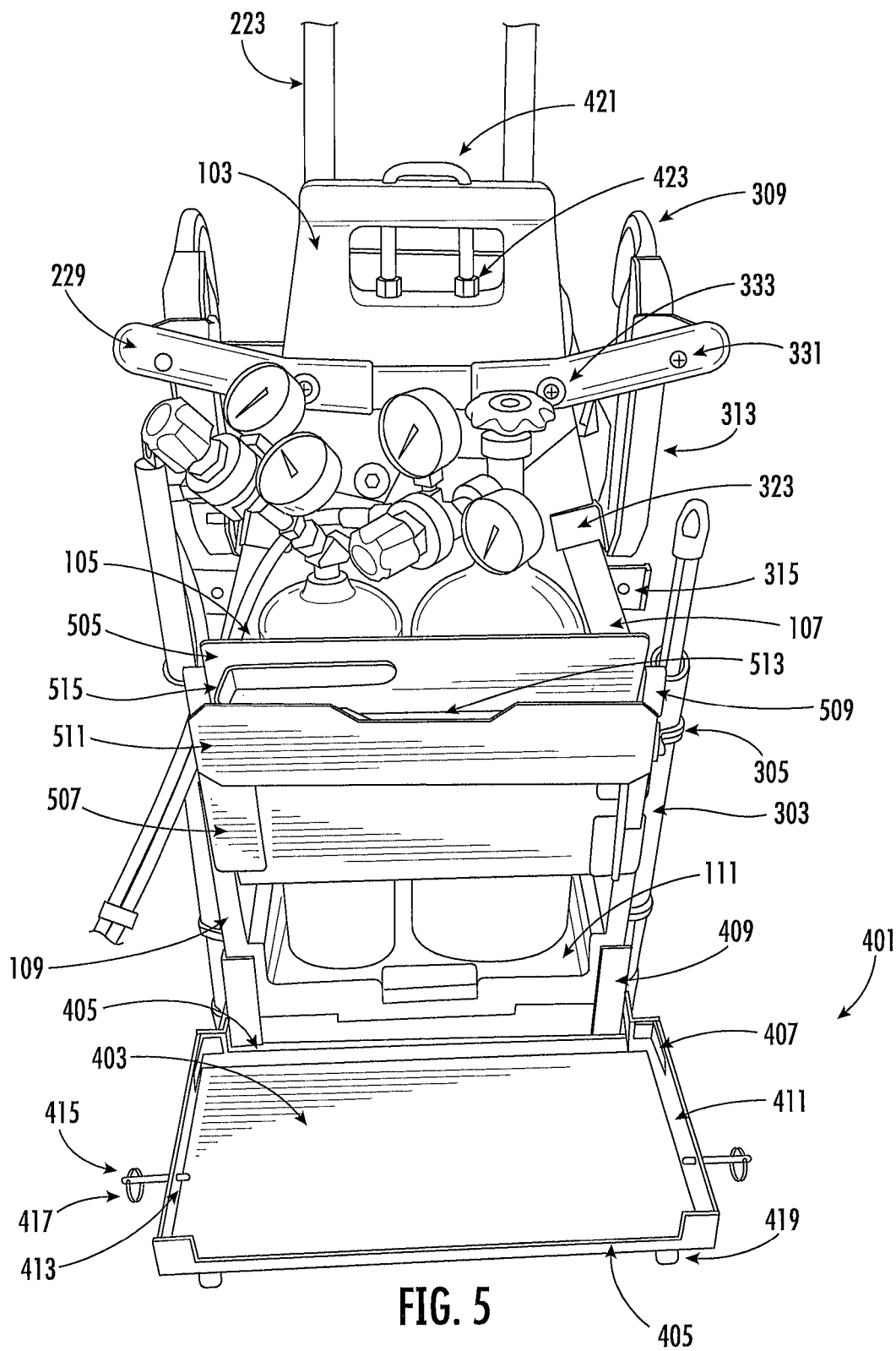
FIG. 5 is a perspective front view of the tank carrier, according to the present application.

Referring now to FIG. 5, the front of tank carrier 100 is depicted with retractable tow cradle 401 down. Retractable tow cradle 401 further comprises base 403, crenellated walls 405, L support 407, base fastener 409, side walls 411, fastener hole 413, fastener pin 415, loop handle 417, support legs 419, retractable hoist ring 421, and retractable hoist ring stoppers 423. Also shown in FIG. 5 are ladder hooks 309 being secured to double handles 229 by handle fastener 331. Tank carrier base 111 is also depicted which is notched in order to secure tanks once they are inserted into tank carrier 100. The front of bottle access door 501 is also depicted which comprises back plate 505, support plate 507, T-shaped supports 509, front plate 511, tool compartment bottom plate 513, and compartment support 515.

Retractable tow cradle 401 is designed to act as a dolly and hold another object on tank carrier 100 while it is in tow. This object could be another tank, a vacuum pump, tools, or any other object that the user wants to tow. This gives the user a place to tow the heavy objects so that way they do not have to physically carry them with their hands while traveling to the job site. This will save trips and also reduce the physical strain put on the user.

Retractable tow cradle 401 is formed with 4 walls surrounding base 403. The front and back walls are crenellated walls 405 as there is a notch in them that covers most of the wall. The other walls that form retractable tow cradle 401 are side walls 411. Also, on side walls 411 there is L support 407 which connects to base fastener 409 which is used to connect retractable tow cradle 401 to tank carrier 100. Underneath base 403, there are four support legs 419 which are used to help support tank carrier 100 when it is set in place with the retractable tow cradle 401 is in the down position.

Side walls 411 have a fastener hole 413 in the middle of each of them which fastener pin 415 is inserted into. When fastener pin 415 is fully inserted through fastener hole 413, the pin will catch on bottle access door 501 which will secure retractable tow cradle 401 in the upright position. But, when a user pulls on loop handle 417 attached to the end of fastener pin 415, the pin will pull out of fastener hole 413 and so retractable tow cradle 401 will be loosened and go into the down position.

Also in FIG. 5 is another look at retractable hoist ring 421. Retractable hoist ring 421 is a U-shaped ring which is inserted into the top of hollow arched body 101. The hoist ring 421 usually stays in the down position, due to gravity, but can be pulled up to allow the user to attach a rope, rope clip, hoist connector, or any other connection device to hoist ring 421 to hoist it up somewhere if they don't want to use or can't use the back straps. Stoppers 423 prevent ring 421 from fully going through hollow arched body 101 when it is being hoisted. Stoppers 423 are larger than the hole that ring 421 is inserted through and so once ring 421 has gone a certain length it will no longer be able to be pulled out further. These stoppers make sure that ring 421 will not be pulled out of the system while tank carrier 100 is being hoisted up.

Figure 7:
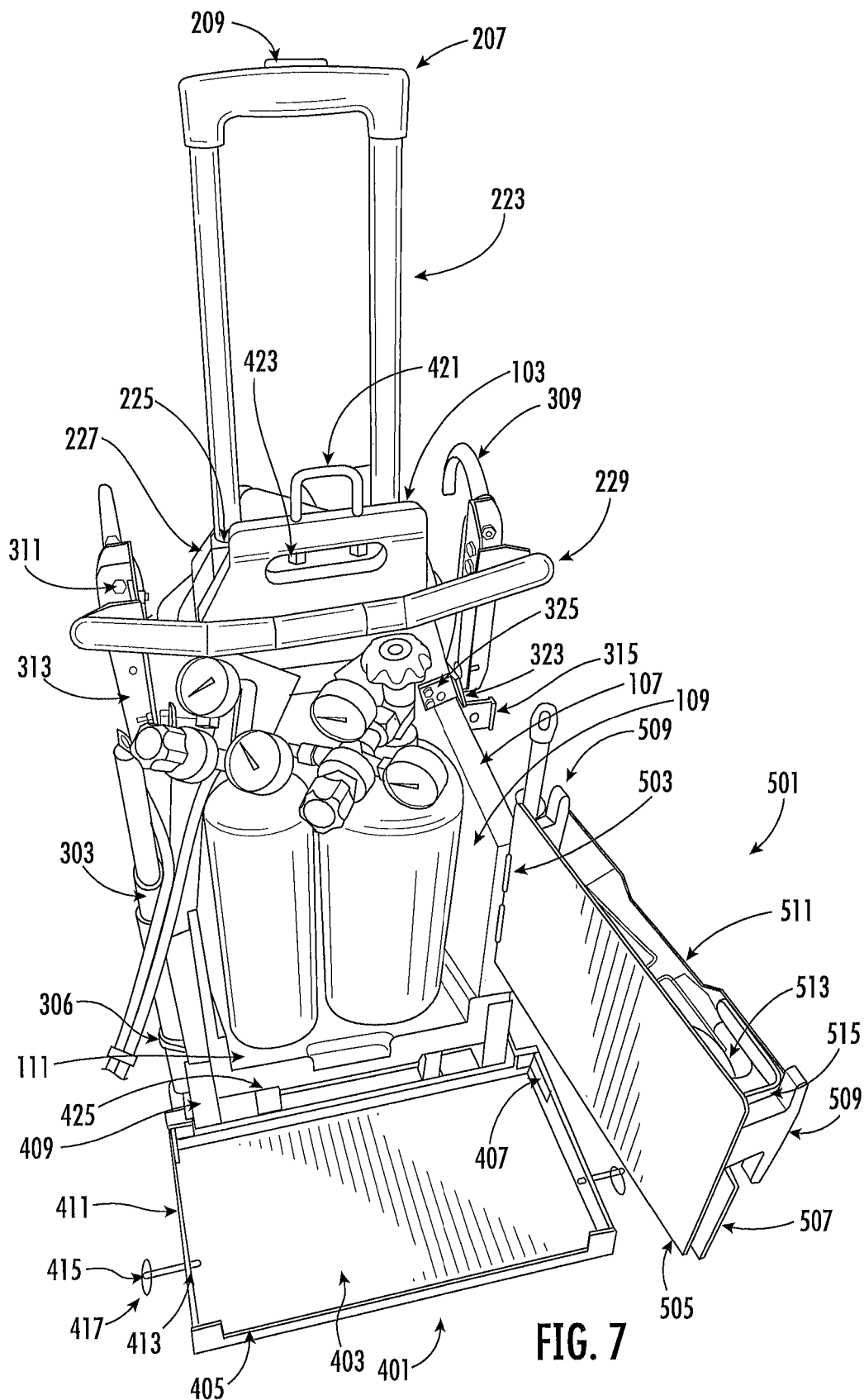
FIG. 7 is a perspective front view of the tank carrier, according to the present application.
Figure 8:
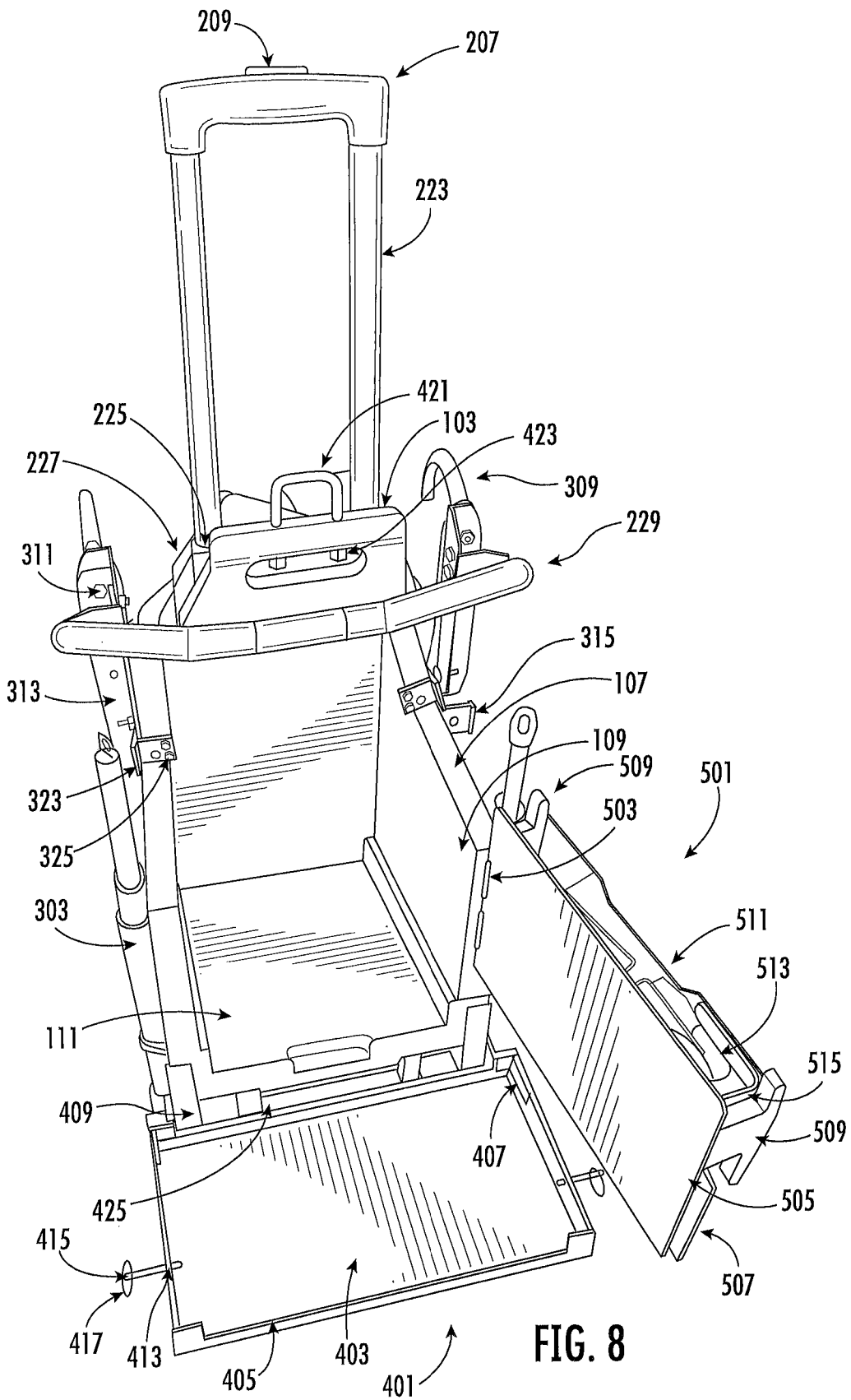
FIG. 8 is a perspective front view of the tank carrier, according to the present application.

Referring now to FIGS. 7 and 8 in the drawings, the perspective front view of tank carrier 100 is depicted with bottle access door 501 in the open position. Access door 501 further comprises hinge 503, back plate 505, support plate 507, T-shaped supports 509, front plate 511, tool compartment bottom plate 513, and tool compartment support 515. FIG. 7 also shows retractable cradle hinge 425 which is used to move the retractable tow cradle into the upright and down position. Also, FIG. 7 further depicts tow handle 207 in the pulled out position giving a look at how support bars 223 are used to provide extra length to the user towing it. Support bars 223 are usually stored in hollow arched body 101 and are inserted into tow bar holes 225 which are at the top of tow bar base 227 found at the top of tank carrier 100. FIG. 8 is used to depict how tank carrier 100 would look with access door 501 in the open position along with tank carrier 100 not housing any tanks.

Access door 501 is used to secure tanks that the user is currently carrying in tank carrier 100 while also allowing the user to access them easily. It is important that the tanks are secured during movement by the user so access door 501 is used to sandwich the tanks between the door and arched body 101 to secure them in place when access door 501 is closed. Also, since access door 501 can be opened, the user is able to easily change out the tanks that they are carting around without significant delay, or hurt their shoulders or injure themselves from having to pull the bottles straight up and out of a tight carrier.

Back plate 505 directly comes into contact with tanks when they are secured in tank carrier 100. Back plate 505 is connected to arched hollow body 101 by hinge 503 which allows the user to open and close it. Connected to the front lower portion of back plate 505 is support plate 507 which is used to secure bottle access door to tank carrier 100. Above support plate 507, and connected to the front upper portion of back plate 505, are two T-shaped supports 509 on both sides of back plate 505. These supports are used to allow the user to wrap hoses, or other lengths of material, from the tanks or other equipment, around them in order to keep them organized and secured in place.

Attached to the front of the two T-shaped supports 509 is front plate 511. Front plate 511 spans the entire distance between the two supports 509 but does not span the entire vertical length of these supports. Connected to the bottom of front plate 511 and the sides of the T-shaped supports 509 is tool compartment bottom plate 513. With bottom plate 513 in this position, combined with front plate 511 and T-shaped supports 509, a compartment is formed on the access door which allows a user to place items in it. This is useful if the user is wanting to carry tools or other items with them to the job site and does not have any other room to store them. The user will be able to store them in this cubby formed by these plates which will free up their hands and increase the user's safety while they head to their location. Tool compartment support 515 spans the sides of the compartment formed and provides support for all the walls forming together.

Referring now to FIG. 9 in the drawing, a side view of tank carrier 100 is depicted being hoisted up a building ladder with retractable ladder hooks 309 being used. FIG. 9 depicts how ladder hooks 309 will be utilized if an individual were to take a break while hoisting tank carrier 100 up a building ladder. This shows how hooks 309 engage with the building ladder along with how retractable hoist ring 421 is used to hoist up tank carrier 100.

Figure 10:
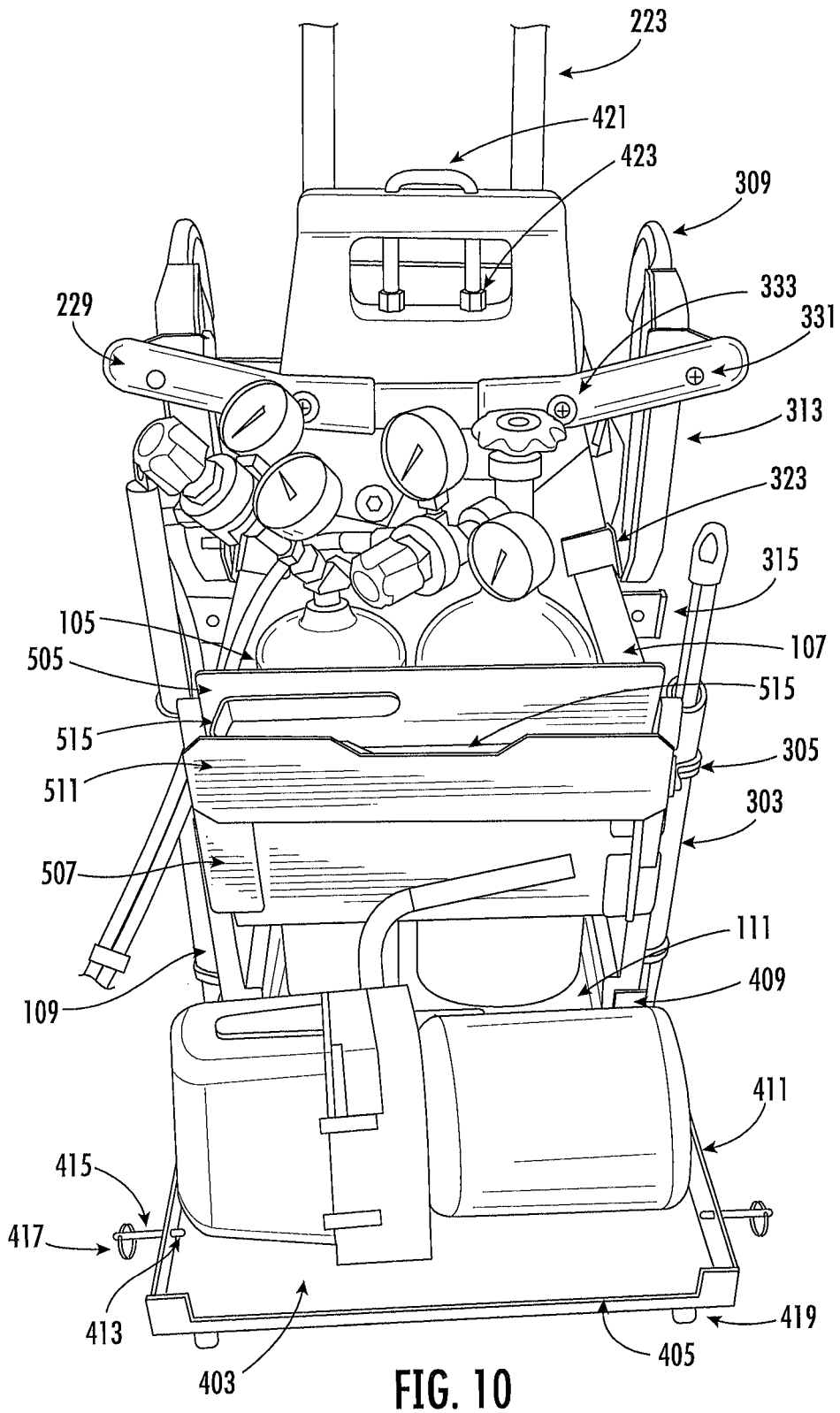
FIG. 10 is a front view of the tank carrier, according to the present application.

Referring now to FIG. 10 in the drawings, a front view of tank carrier 100 is depicted with retractable tow cradle 401 deployed carrying another object. When deployed, tow cradle 401 will act as a dolly which will allow the user to cart more objects around with them than they would have before. This figure shows how this would look and how a user would go about doing this.

Figure 11:
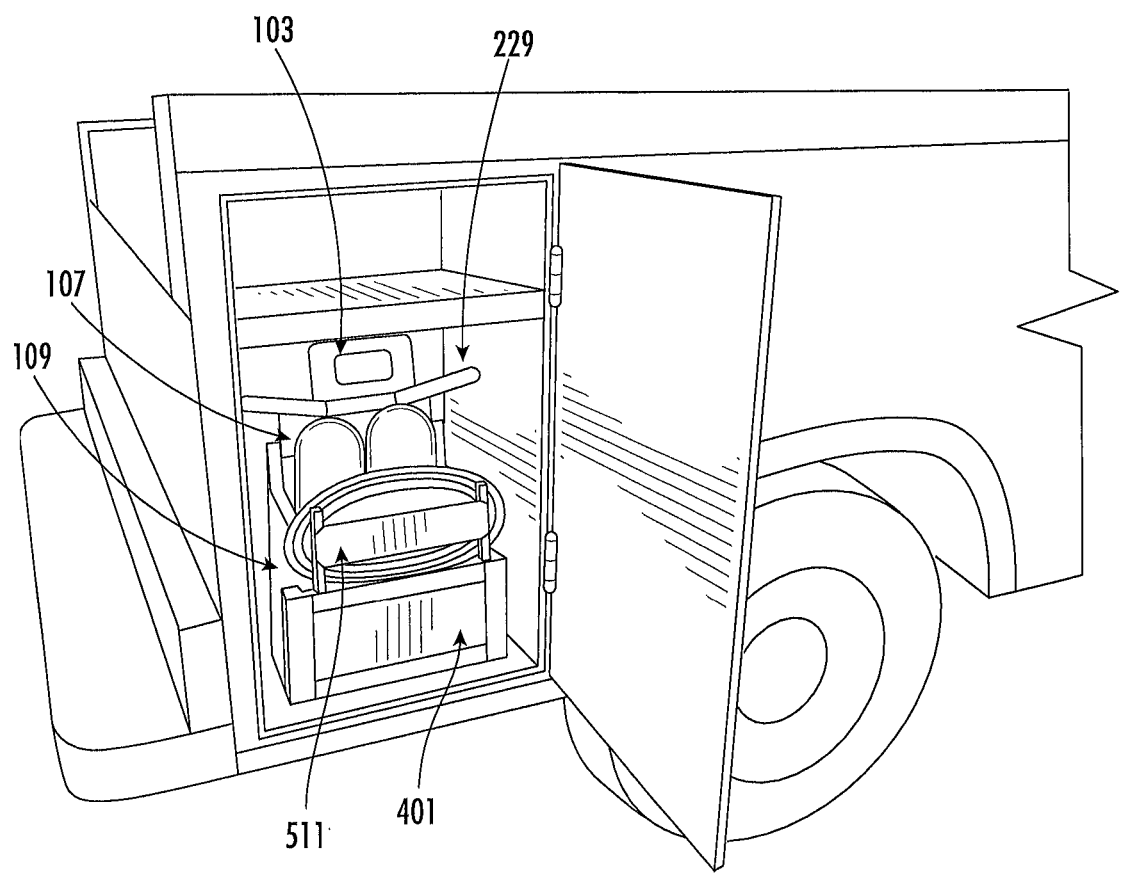
FIG. 11 is a perspective front view of the tank carrier, according to the present application.

Referring now to FIG. 11 in the drawings, a perspective front view of tank carrier 100 being stored in a truck is depicted. It is important that tank carrier 100 be small and compact so that way it does not take up too much space wherever it is stored. FIG. 11 depicts this by showing tank carrier 100 being compact and stored in a standard storage compartment that could be found on the side of work trucks.

Figure 12:
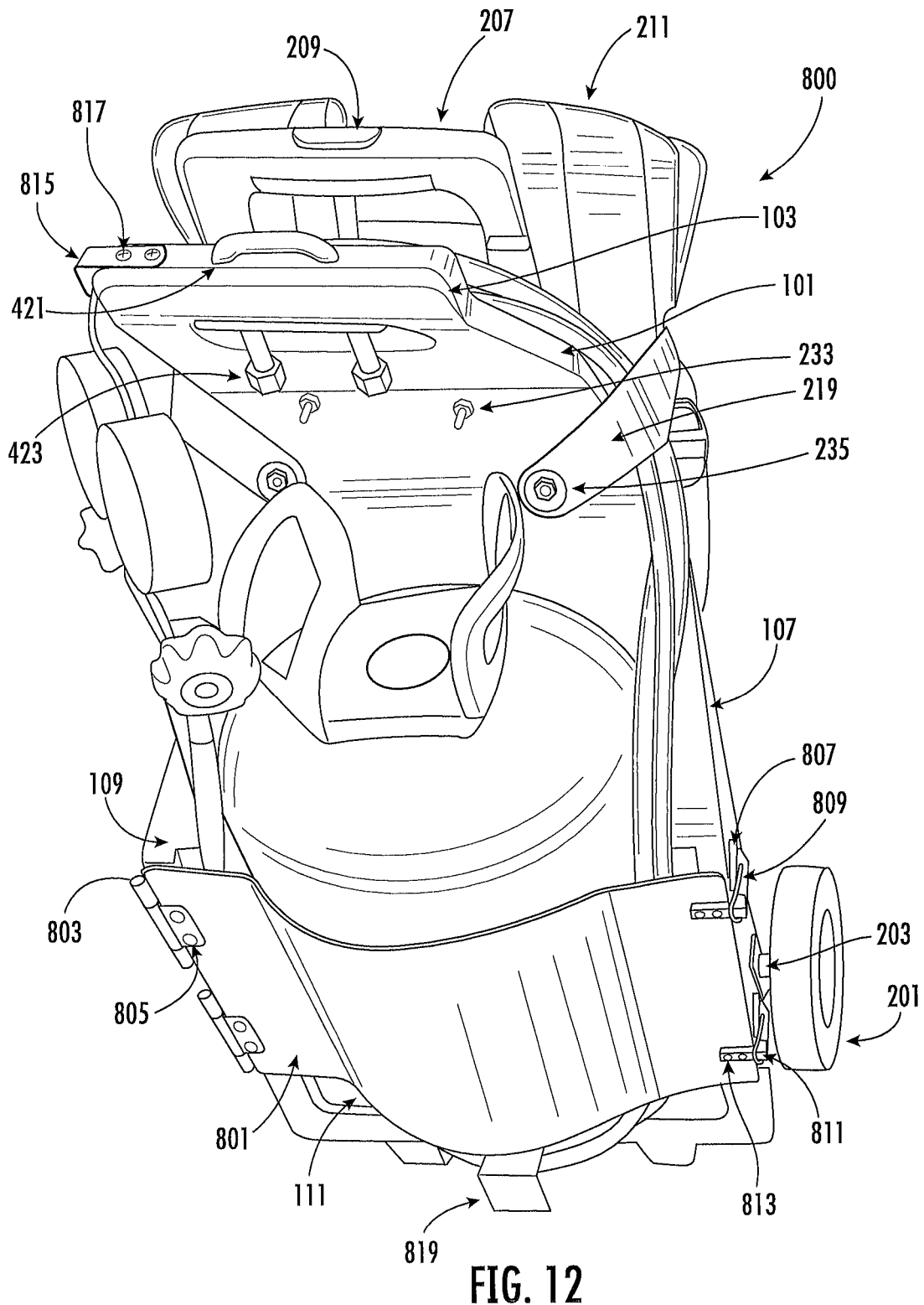
FIG. 12 is a perspective front view of an alternative embodiment of the tank carrier, according to the present application.
Figure 13:
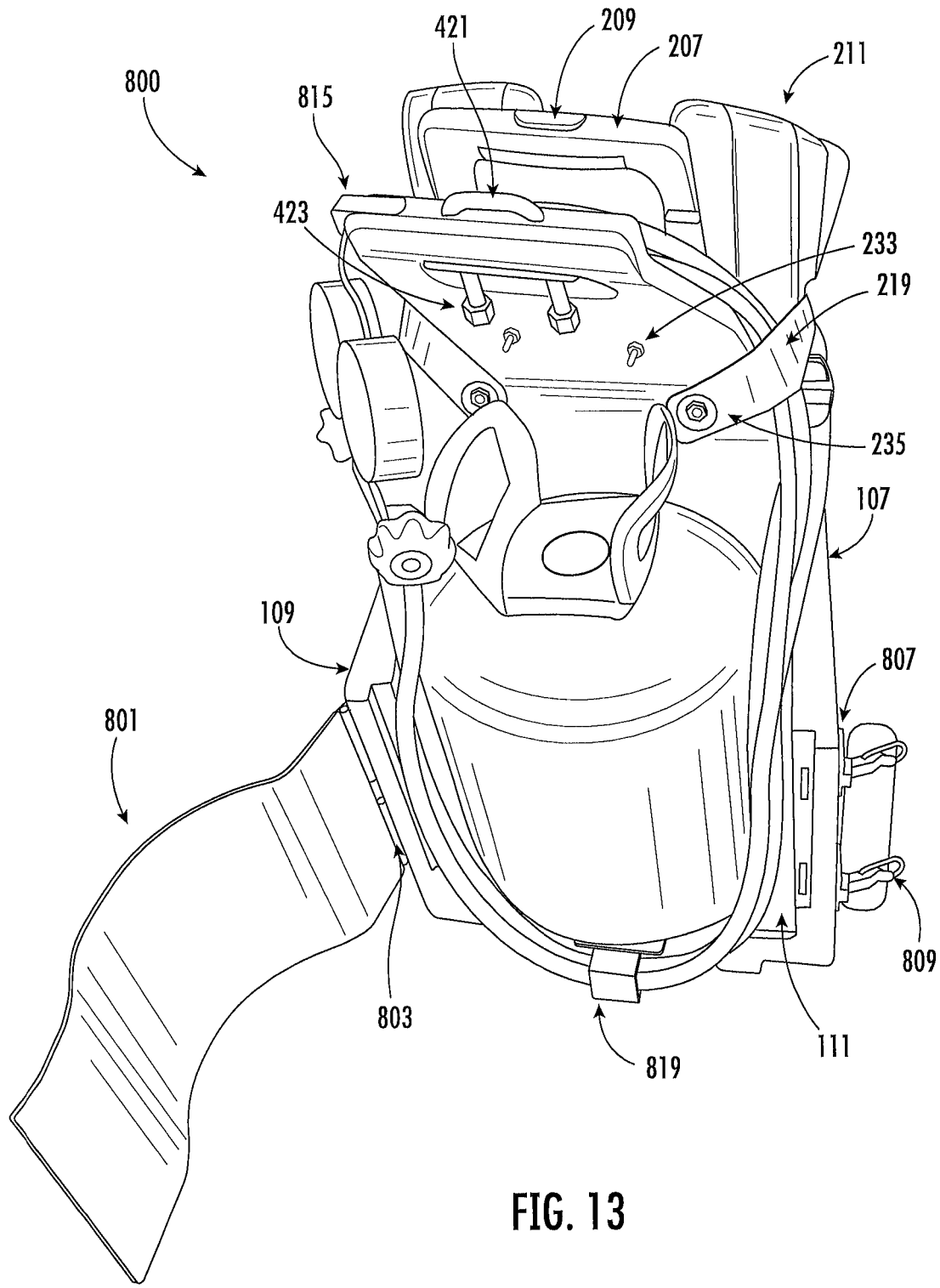
FIG. 13 is a perspective front view of an alternative embodiment of the tank carrier from FIG. 12, according to the present application.
Figure 14:
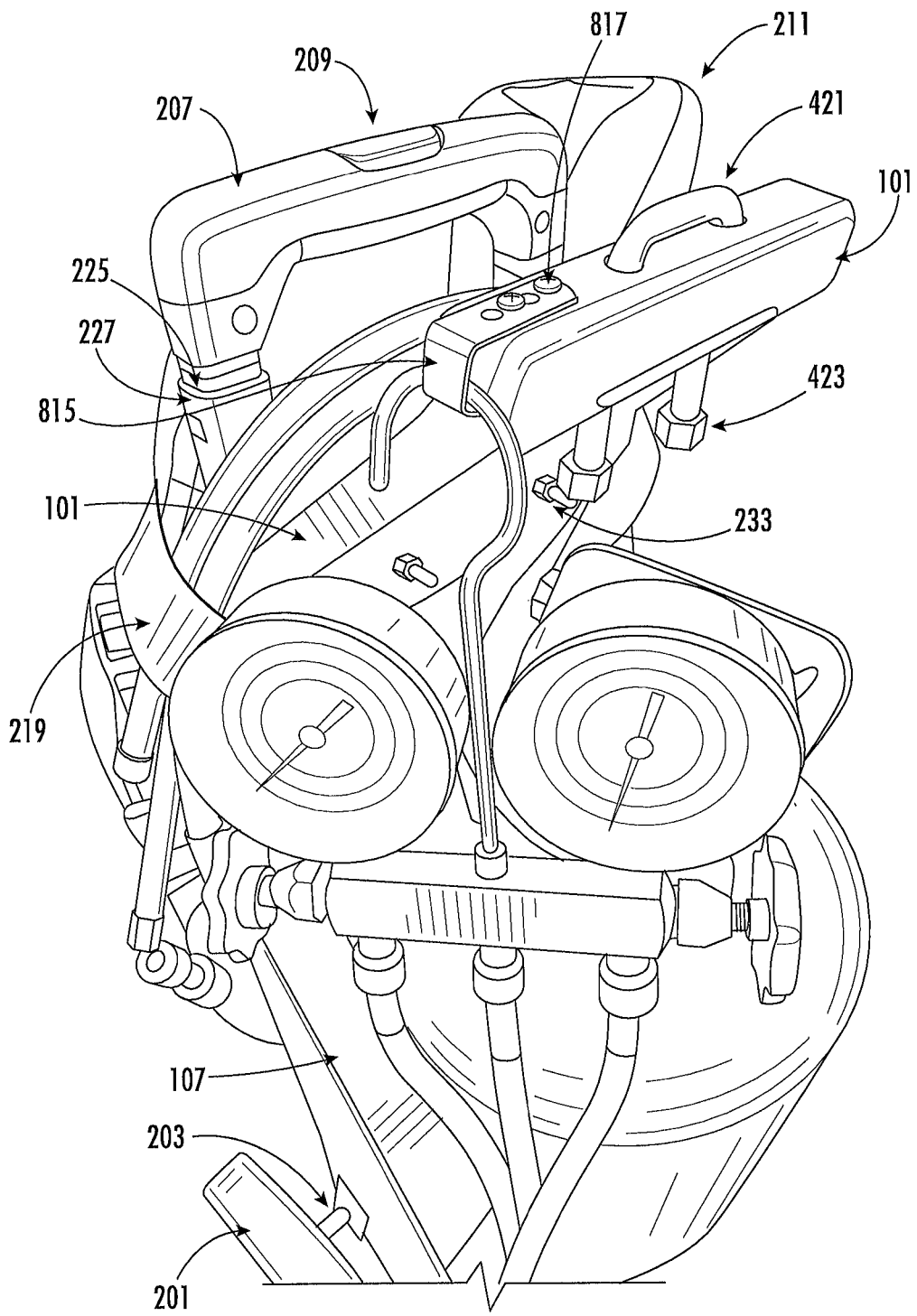
FIG. 14 is perspective left side view of an alternative embodiment of the tank carrier from FIG. 12, according to the present application.
Figure 15:
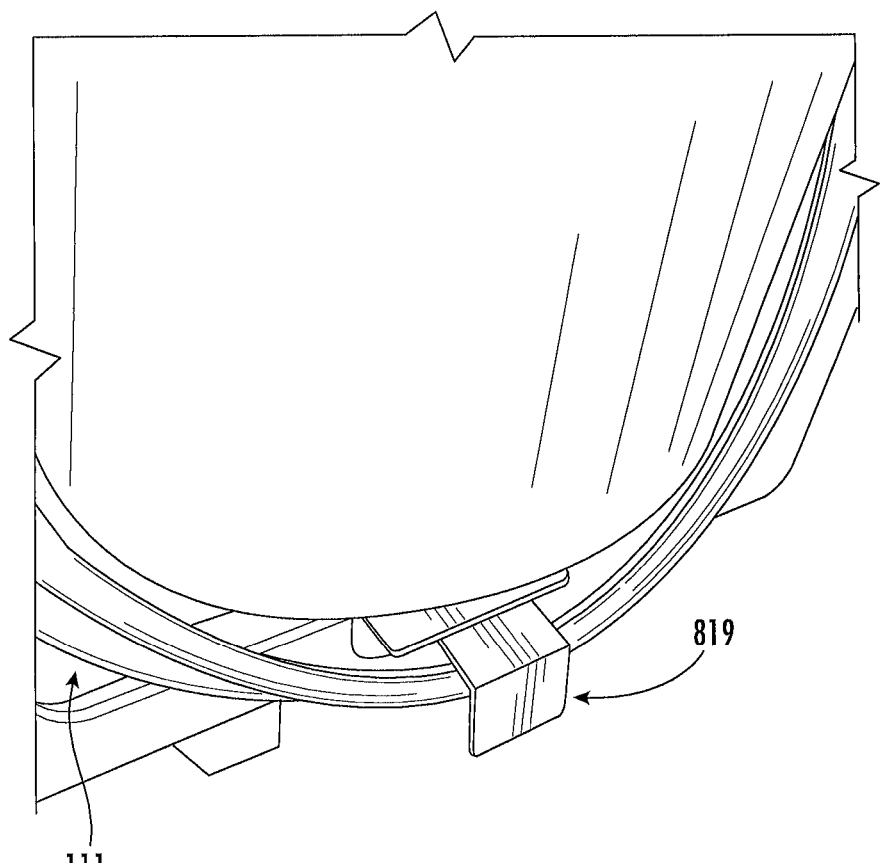
FIG. 15 is a close up perspective front view of an alternative embodiment of the tank carrier from FIG. 12, according to the present application.

Referring now to FIGS. 12, 13, 14, and 15 in the drawings, an alternative embodiment of tank carrier 100, tank carrier 800, is shown. This embodiment differs as it is designed to hold a larger, singular tank and changes the design to reflect that. This alternative embodiment comprises parts from the previous embodiment along with bottle access door 801, hinge 803, hinge fasteners 805, base attachment 807, latch 809, door attachment 811, attachment fasteners 813, hook tab 815, hook tab fasteners 817, and hosing tab 819. It is also noted that this alternative embodiment does not have two handed crossbar double handles 229, retractable ladder hooks 309, nor retractable tow cradle 401. Tank carrier 800 is used to carry, but is not limited to carry, Freon bottles. FIG. 12 also provides a look at back cushion fasteners 233, and security strap fastener 235 which are used in all the embodiments to secure the back cushion and security strap to the tank carrier.

Bottle access door 801 in this embodiment is shaped with a curve in order to accommodate a larger tank, such as but not limited to a Freon tank. These tanks are larger than the tanks that were shown in the original tank carrier 100 and would not have worked in that system. The doors being curved here will guarantee that the tanks are secured. Access door 801 is also slim line in order to keep carrier 800 as compact as it can be. Door 801 is connected to the left side of hollow arched base 101 by hinge 803 which is fastened to door 801 and base 101 by hinge fasteners 805. On the right side of the hollow arched base 101 is base attachment 807 connected directly to base 101 which has latch 809 fastened to it. This latch is used to secure bottle access door 801 in place during movement by latching onto door attachment 811 which is fastened to the door by fasteners 813. This guarantees that door 801 remains secured while in movement.

At the top of tank carrier 800, next to where retractable hoist ring 421 is located, hook tab 815 is protruding to the left of the carrier. This tab is fastened to the top of arched hollow body 101 by tab fasteners 817. Hook tab 815 is a metal bar that extends from the top of hollow body 101 out to the side before coming back down and connecting back to hollow body 101 so as to leave a gap for a hook, or other apparatus used to hold objects, to be inserted there. Hook tab 815 is there so the user can secure gauges, hoses, and other tank equipment during transportation and storage. At the bottom of hollow body 101 is hosing tab 819 which can be used by the individual using tank carrier 800 to wrap around the hosing of the tank to secure it in place during movement. Hosing tab 819 accommodates the role that access door 501 allowed for in tank carrier 100 by giving the user a location to wrap their hosing around in a secured fashion.

Figure 16:
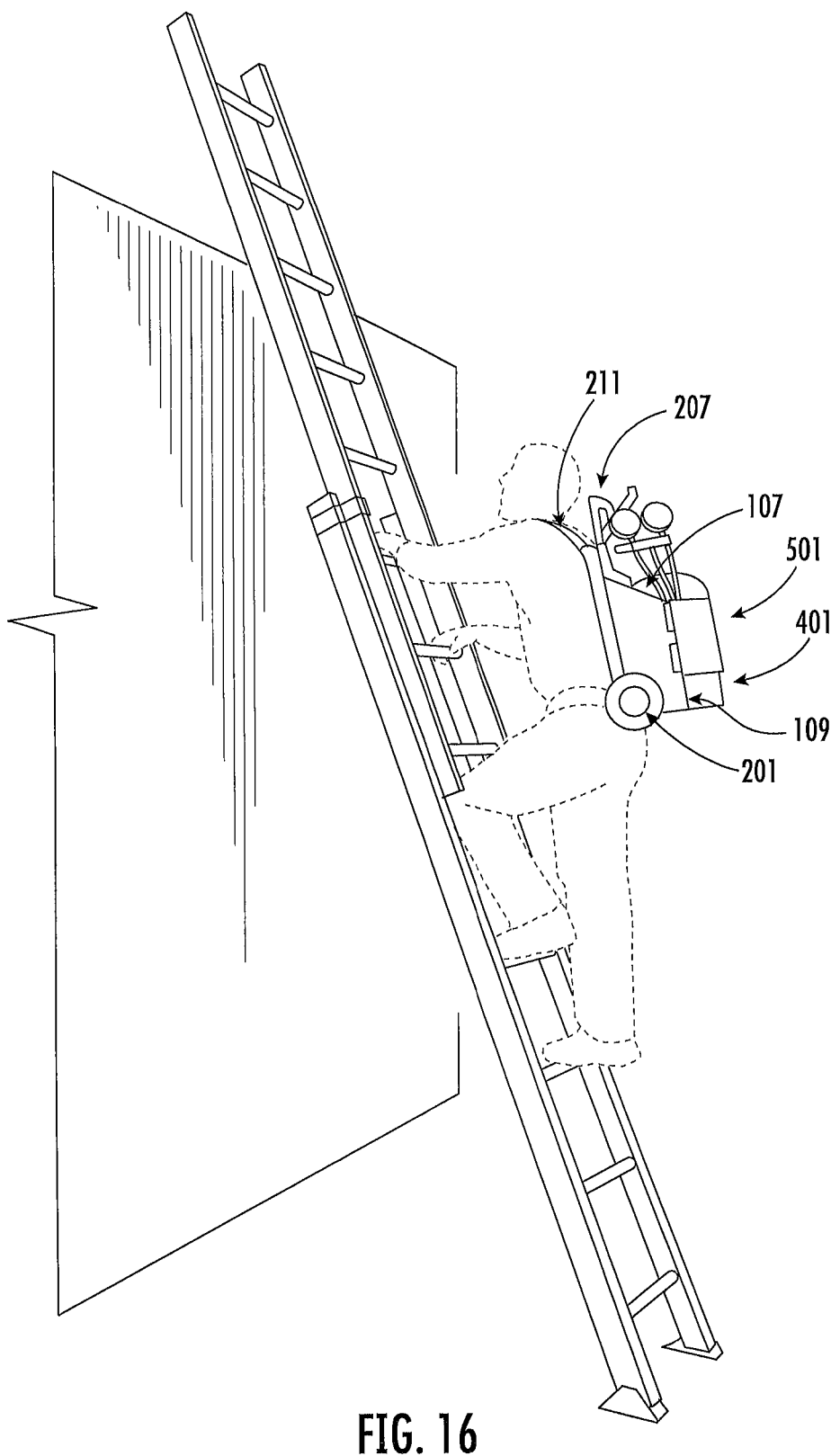
FIG. 16 is a perspective left side view of an alternative embodiment of the tank carrier from FIG. 12, according to the present application.

Referring now to FIG. 16 in the drawings, a side view of tank carrier 800 is depicted being carried on an individual's back while they are climbing an extension ladder. One of the major parts of tank carrier 800 is that the user will be able to carry it on their back using the straps there. FIG. 16 shows how this would look on an individual if they were carrying it up an extension ladder in this fashion.

Figure 17:
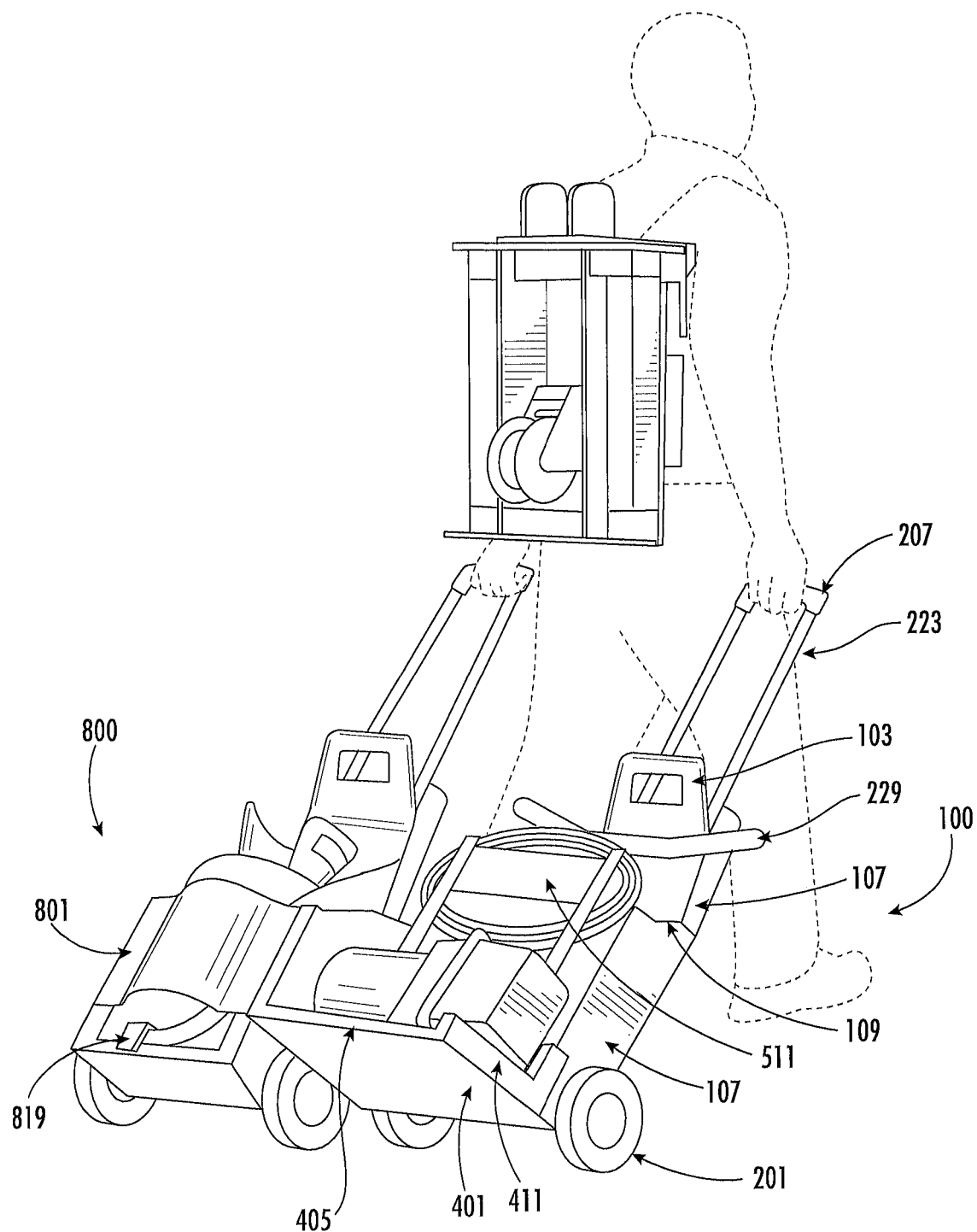
FIG. 17 is a perspective right side view of the tank carrier and an alternative embodiment of the tank carrier from FIG. 12, according to the present application.

Referring now to FIG. 17 in the drawings, a perspective back view of tank carrier 100 and tank carrier 800 being pulled by an individual by their tow handle 207 is depicted. Tow handle 207, in conjunction with wheels 201 is an important aspect as it allows the user to use one hand to tow the entire tank carrier around with them. As shown in FIG. 17 as well, when the user utilizes this they will be able to tow a tank carrier in each hand which decreases the amount of trips the user would need to take.

Figure 18:
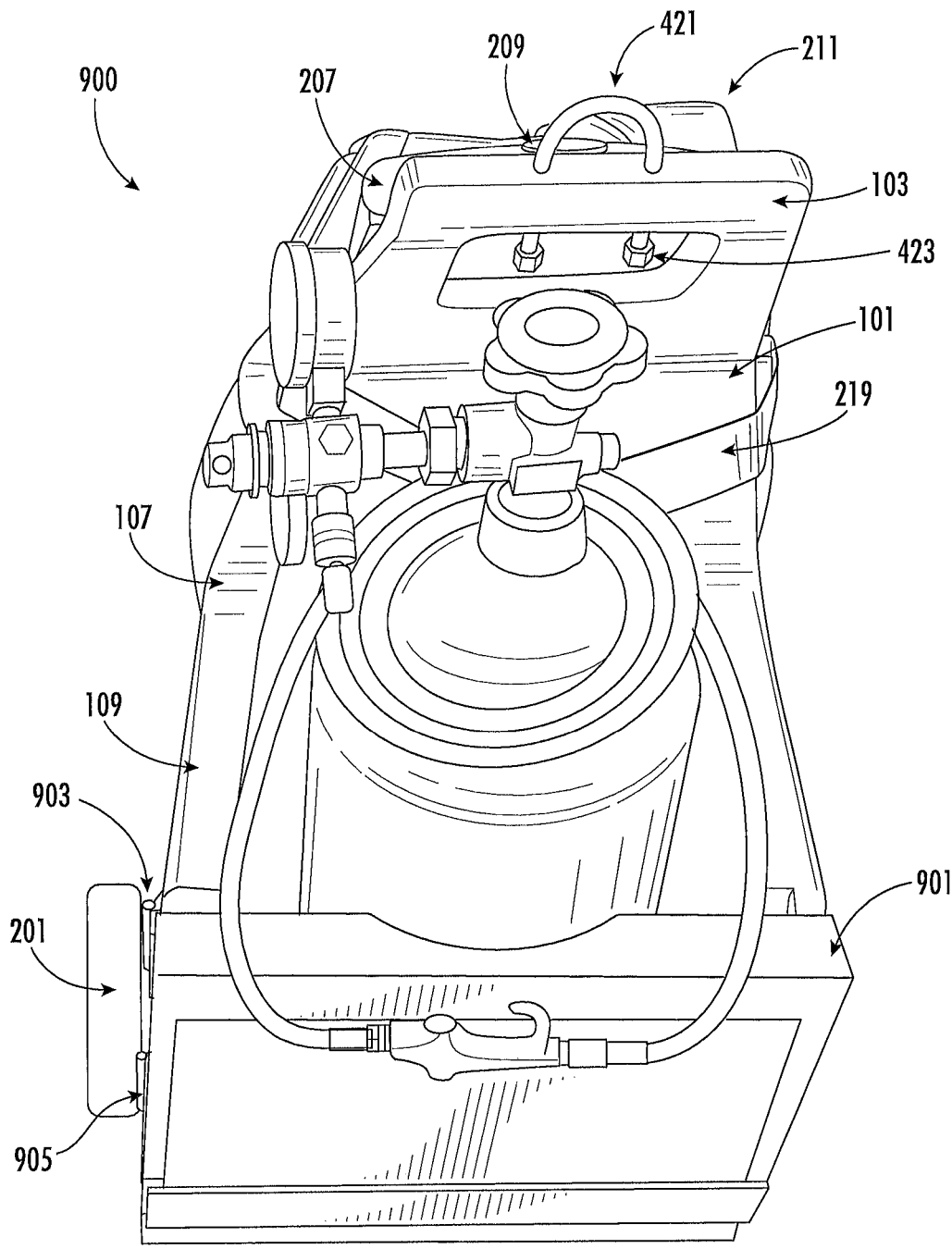
FIG. 18 is a perspective front view of another alternative embodiment of tank carrier, according to the present application.
Figure 19:
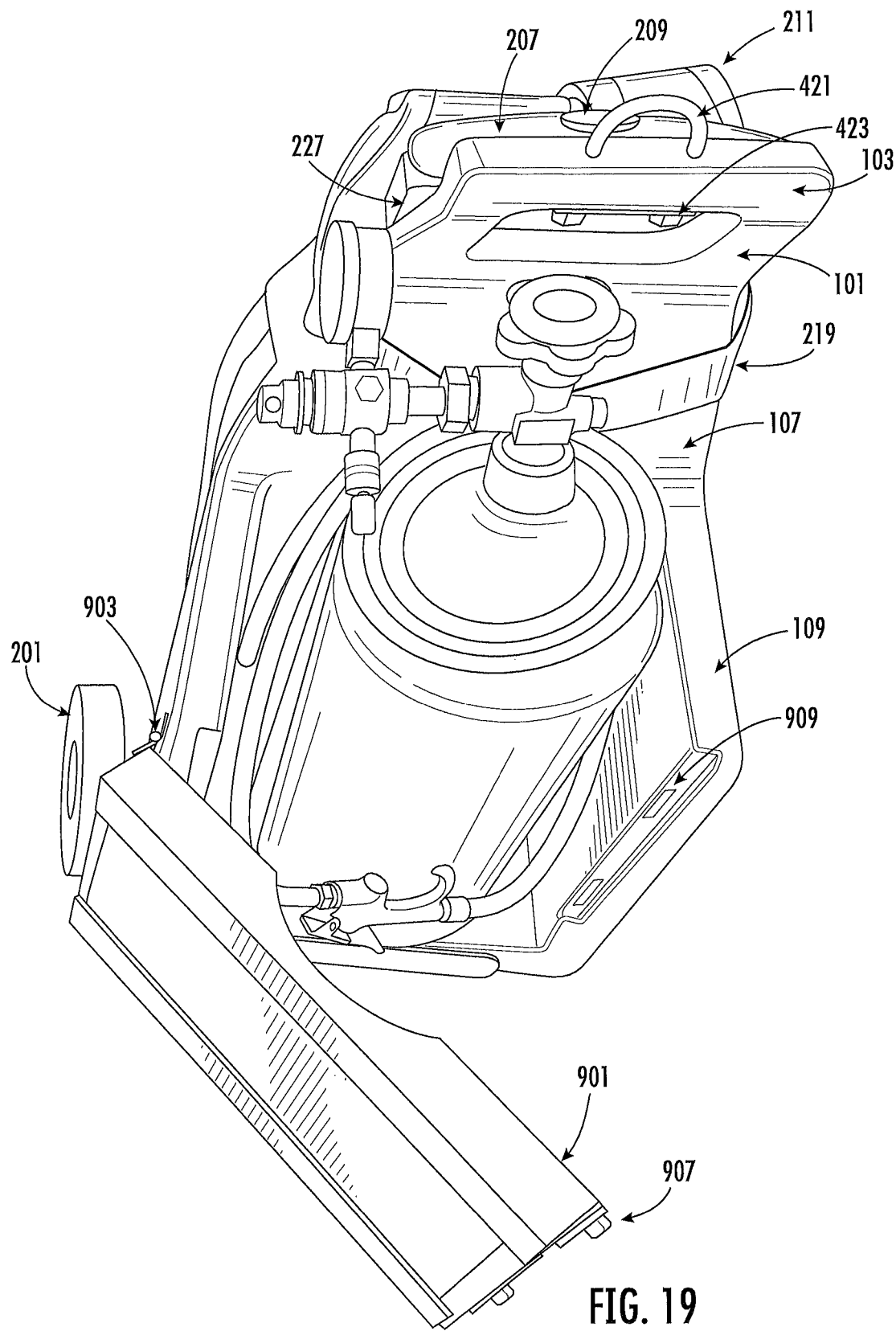
FIG. 19 is a perspective front view of an alternative embodiment of the tank carrier from FIG. 18, according to the present application.

Referring now to FIGS. 18 and 19 in the drawings, another alternative embodiment of tank carrier 100, tank carrier 900, is shown. Like FIG. 12, tank carrier 900 does not have two handed crossbar double handles 229, retractable ladder hooks 309, nor retractable tow cradle 401. In this figure, the modifications that can be seen is access door 901, access door hinge 903, hinge fasteners 905, locking inserts 907, and insert housing 909. Tank carrier 900 is used to carry, but is not limited to carrying, nitrogen bottles.

As was mentioned in the previous alternative embodiment, tank carrier 900 is designed for situations where the tank carried is too large for the previous tank carrier 100. The tank in this situation is not as round as the one in FIG. 12, however, it is still too large for tank carrier 100. Unlike the door in FIG. 12, access door 901 is not curved and is straight along its outside length. The inside length of door 901 is curved to fit the dimensions of the tank used. Using this method will keep the tank securely fixed in position when tank carrier 900 is in movement. Door 901 is also thicker than previous embodiments which allows it to be straight on its outside face but curved inward on the inward face. Like tank carrier 800, tank carrier 900 also uses a hinge connecting door 901 to arched hollow base 101 that is secured to both object by hinge fasteners 905. Unlike tank carrier 800, connecting door 901 is secured in the closed position by locking inserts 907, found on the side of door 901, inserting into insert housing 909 found on arched hollow base 101. Once inserted, access door 901 will be secured and will not come loose.

Figure 20:
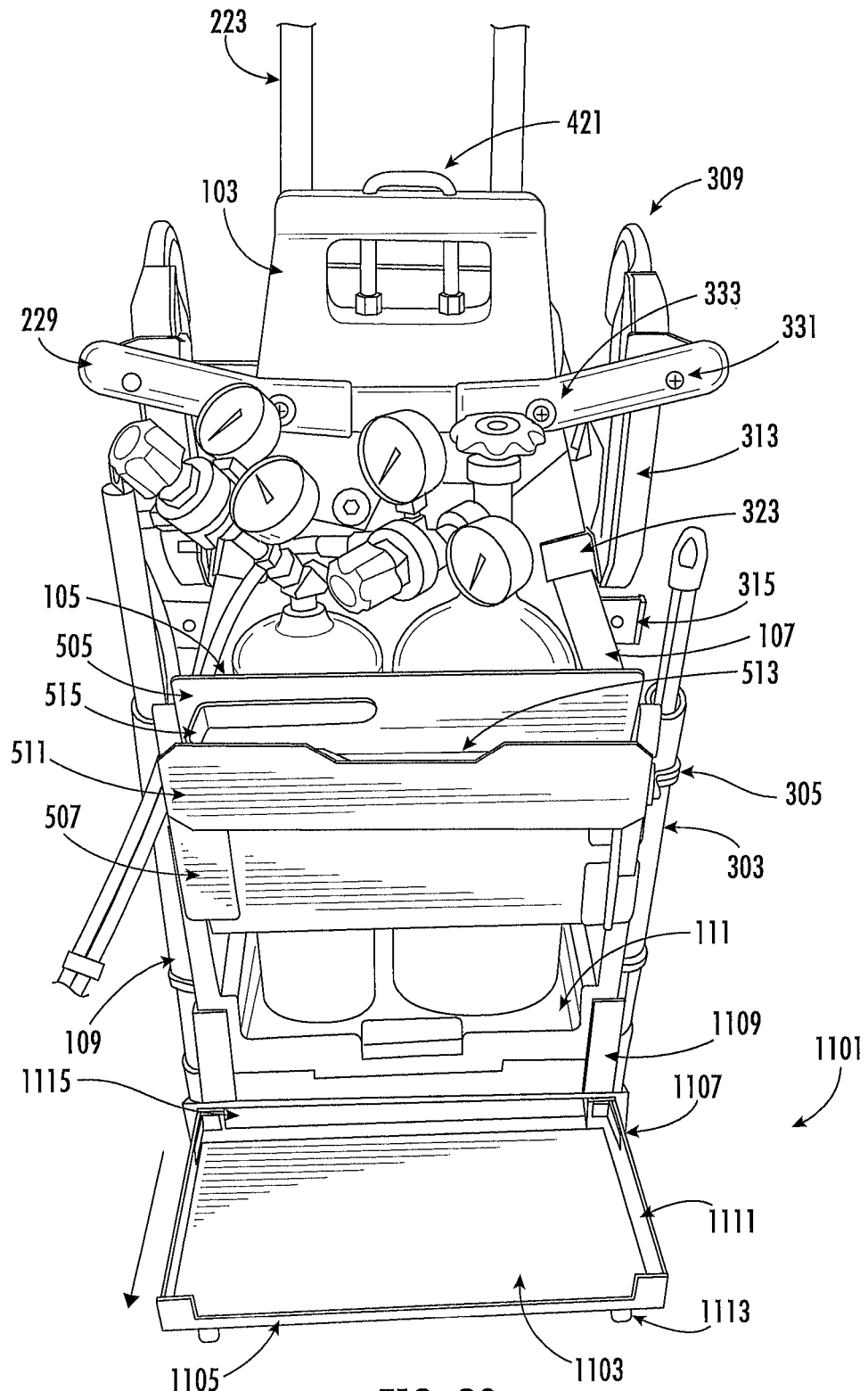
FIG. 20 is a perspective front view of another alternative embodiment of tank carrier, according to the present application.

Referring now to FIG. 20 in the drawings, a perspective front view of an alternative embodiment of tank carrier 100 is depicted. This alternative embodiment, hereinafter carrier 1100, shares a majority of its structure with tank carrier 900. The main difference is that carrier 1100 is designed to carry other objects that are not tanks, such as, but not limited to, tools, compressors, motors, or other objects. Carrier 1100 has slide out dolly 1101 which is comprised of base 1103, crenellated walls 1105, L support 1107, base fastener 1109, side walls 1111, support legs 1113, and slide out housing 1115. Slide out dolly 1101 functions the same as retractable dolly 401 but instead the user will be able to slide dolly 1101 out of housing 1115 when they wish to use it instead of taking out pins to put it in the down position.

It is apparent that an invention with significant advantages has been described and illustrated. Although the present application is shown in a limited number of forms, it is not limited to just these forms, but is amendable to various changes and modifications without departing from the spirit thereof.

What is claimed is:

1. A tank carrier comprising:
a tank compartment defined by at least one pair of end walls, an arched base, a handle portion, and a base;
a retractable hoist ring disposed at a top of the arched base;
at least one wheel attached to the base of the tank carrier;
at least one support strap attached to a back of the arched base; and
a front access door;
wherein the retractable hoist ring is stored within the arched base when not extended.

2. The tank carrier of claim 1, wherein the tank carrier is comprised of a lightweight material.

3. The tank carrier of claim 1, wherein the base of the compartment for tanks is notched to fit tanks.

4. The tank carrier of claim 1, further comprising:
a pair of opposing crossbar handles extending outwardly from a side at the top of the arched base; and
a fastener hole at the end of each side of the double handle;
wherein the pair of crossbar handles provide handholds to allow an individual to lift up the tank carrier.

5. The tank carrier of claim 1, further comprising:
a cushion attached to the back of back wall;
at least one additional support strap attached to the back of the arched base;
a strap buckle housing on at least one support strap;
a strap buckle insert on the at least one additional support strap, such that the pack can be secured to the user by inserting the buckle insert into the buckle housing; and
at least one upper tightening grip for adjusting the length of the at least one support strap; and
at least one lower tightening grip for adjusting the length of the at least one support strap.

6. The tank carrier of claim 1, wherein the support straps are replaceable.

7. The tank carrier of claim 1, further comprising:
at least one rod storage compartment.

8. The tank carrier of claim 7, further comprising:
at least one C-shaped fastener; and
at least one balancing foot attached to the bottom of the rod storage compartment.

9. The tank carrier of claim 1, further comprising:
at least one retractable ladder hook.

10. The tank carrier of claim 9, further comprising:
a rotatable base plate;
a base attachment plate;
a upper hook base; and
a lower hook base.

11. The tank carrier of claim 1, further comprising:
a retractable dolly.

12. The tank carrier of claim 11, wherein the retractable dolly comprises:
at least one crenellated end wall and at least one straight end wall connected by a base;
at least one support leg on a bottom of the base;
a retractable cradle hinge; and
a least one fastener pin through the straight end wall.

13. The tank carrier of claim 1, further comprising:
a slide out dolly.

14. The tank carrier of claim 13, wherein the slide out dolly comprises:
at least one crenellated end wall and at least one straight end wall connected by a base;
at least one support tab on the bottom of the base; and
a housing in the tank carrier to slide the dolly into and out of.

15. The tank carrier of claim 1, wherein the front access door shape may be curved, straight, both, or any other shape.

16. The tank carrier of claim 1, wherein the front access door further comprises:
a back plate;
at least one T-shaped support;
a support plate;
a front plate;
a bottom plate; and
a compartment support.

17. The tank carrier of claim 1, further comprising:
a vertically telescopic tow handle;
at least one tow handle support;
a tow handle base; and
a tow handle release.

18. The tank carrier of claim 1, further comprising:
a pair of stoppers at the ends of the hoist ring;
wherein the hoist ring is retractable and U-shaped.

* * * * *